Dec. 30, 1941.   W. F. GROENE ET AL   2,268,200
CRANKSHAFT LATHE
Filed Nov. 29, 1940   12 Sheets-Sheet 3
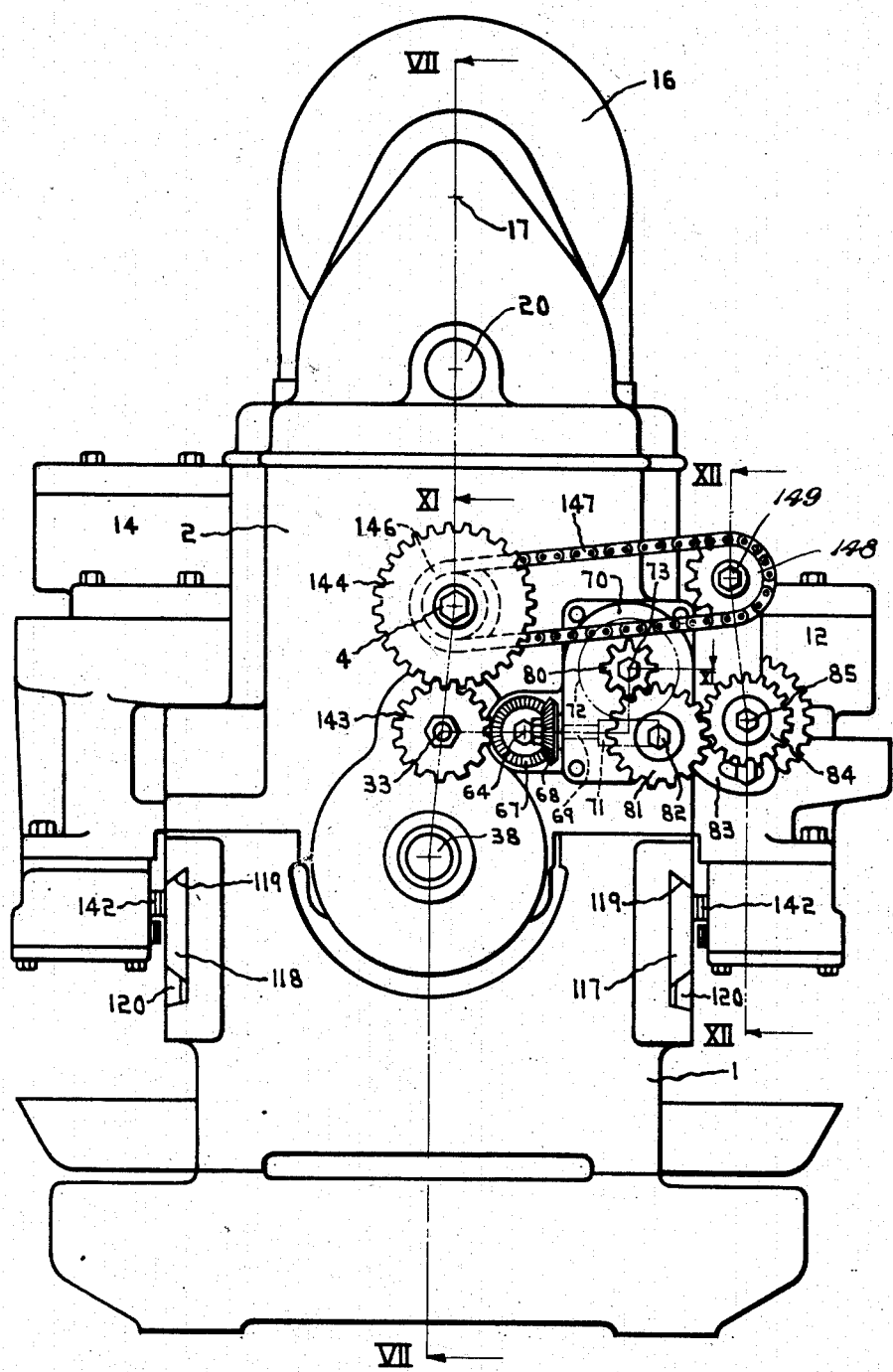
FIG. III
INVENTOR.
WILLIAM F. GROENE
HAROLD J. SIEKMANN
BY
Willard S. Groene Dec. 30, 1941.    W. F. GROENE ET AL    2,268,200
CRANKSHAFT LATHE
Filed Nov. 29, 1940    12 Sheets-Sheet 4
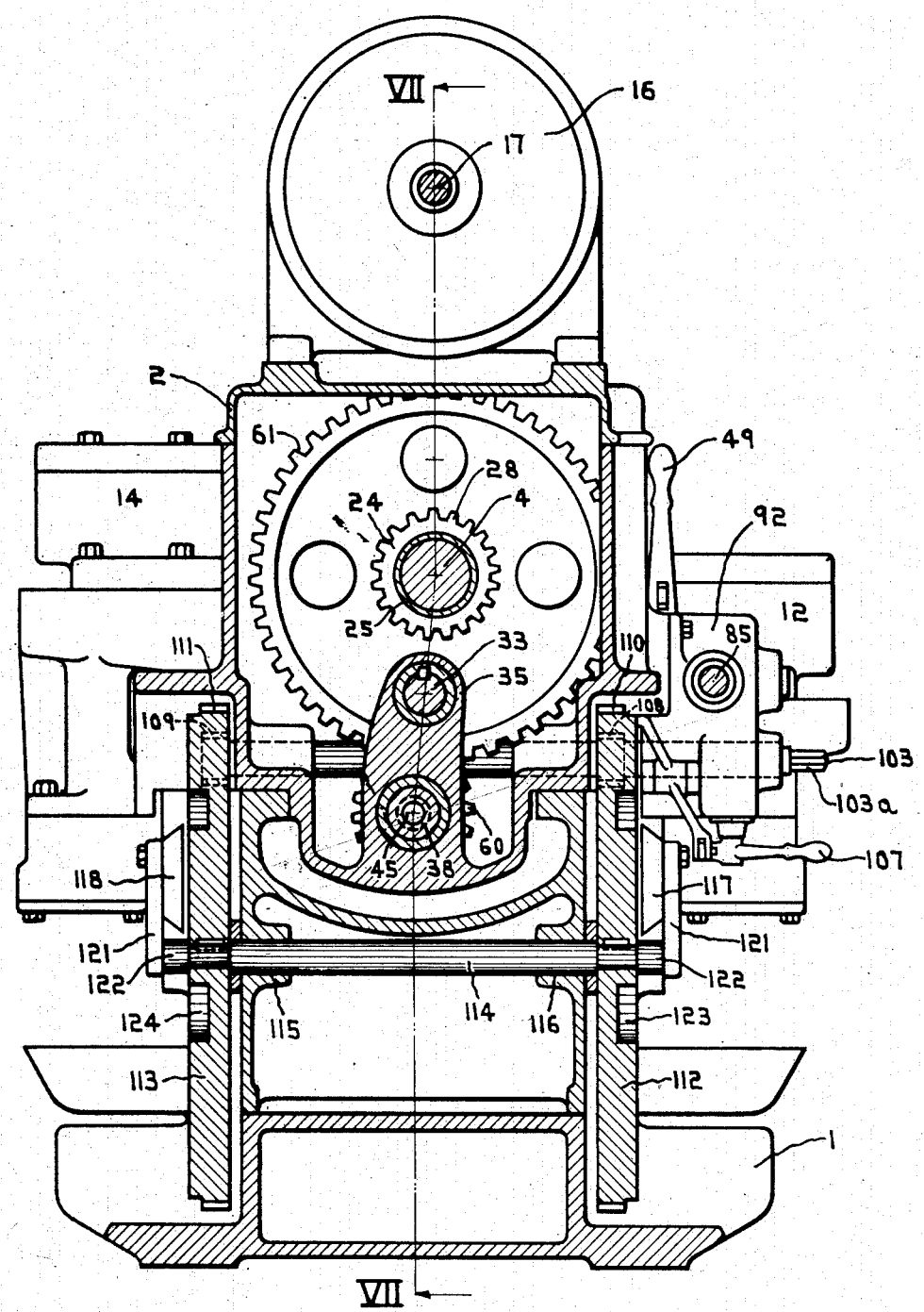
FIG. IV
INVENTOR.
WILLIAM F. GROENE
HAROLD J. SIEKMANN
BY
Willard L. Groene

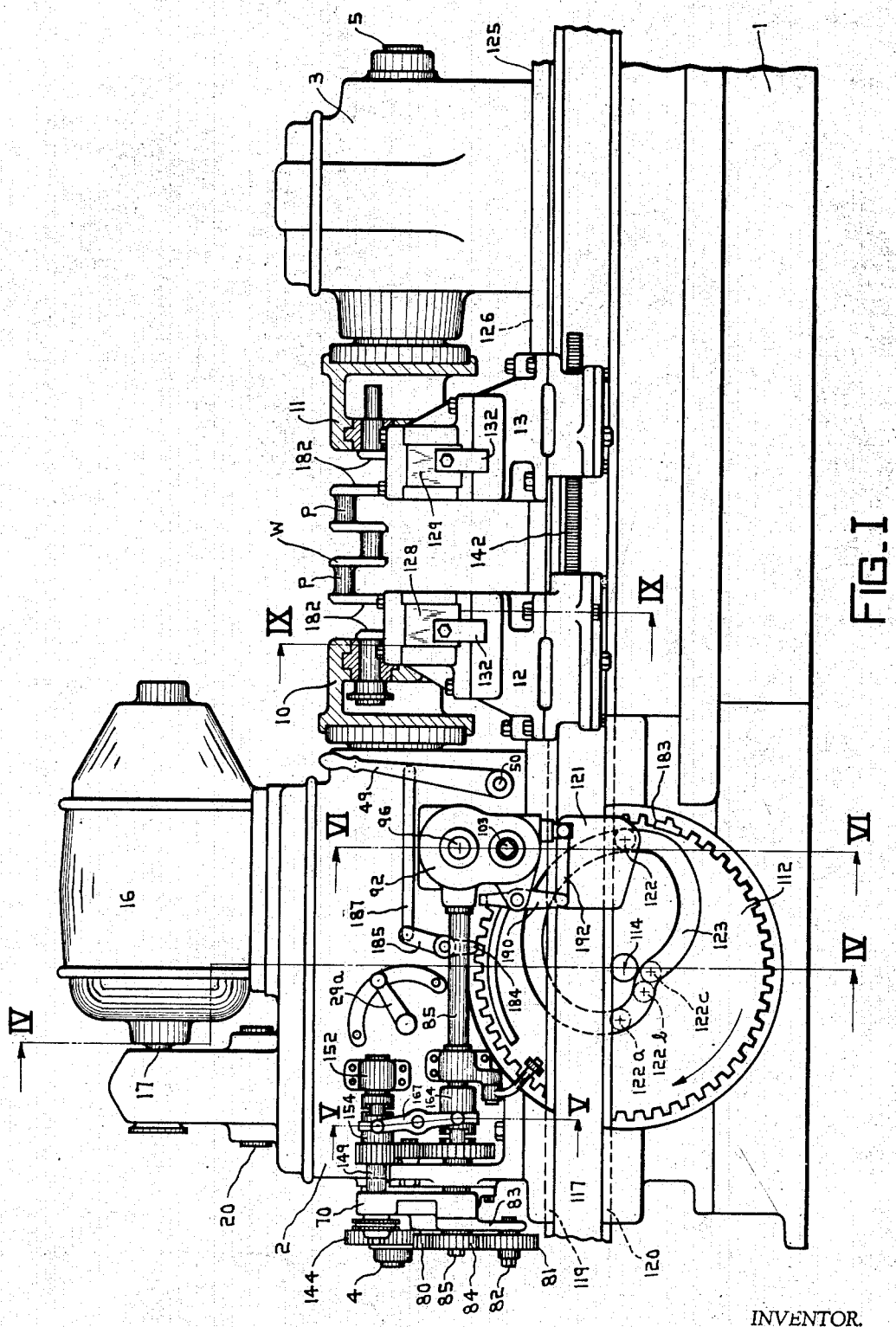

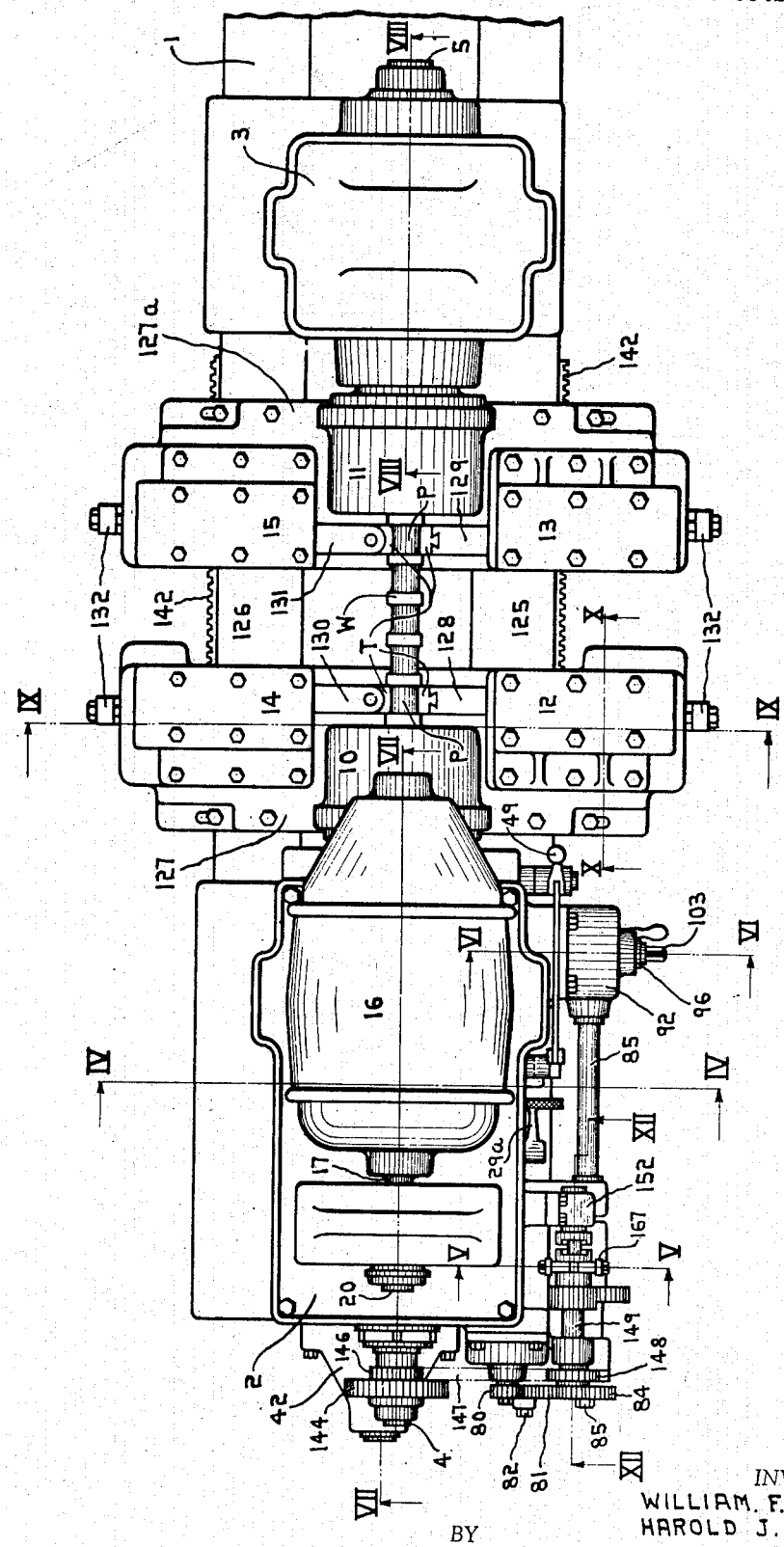

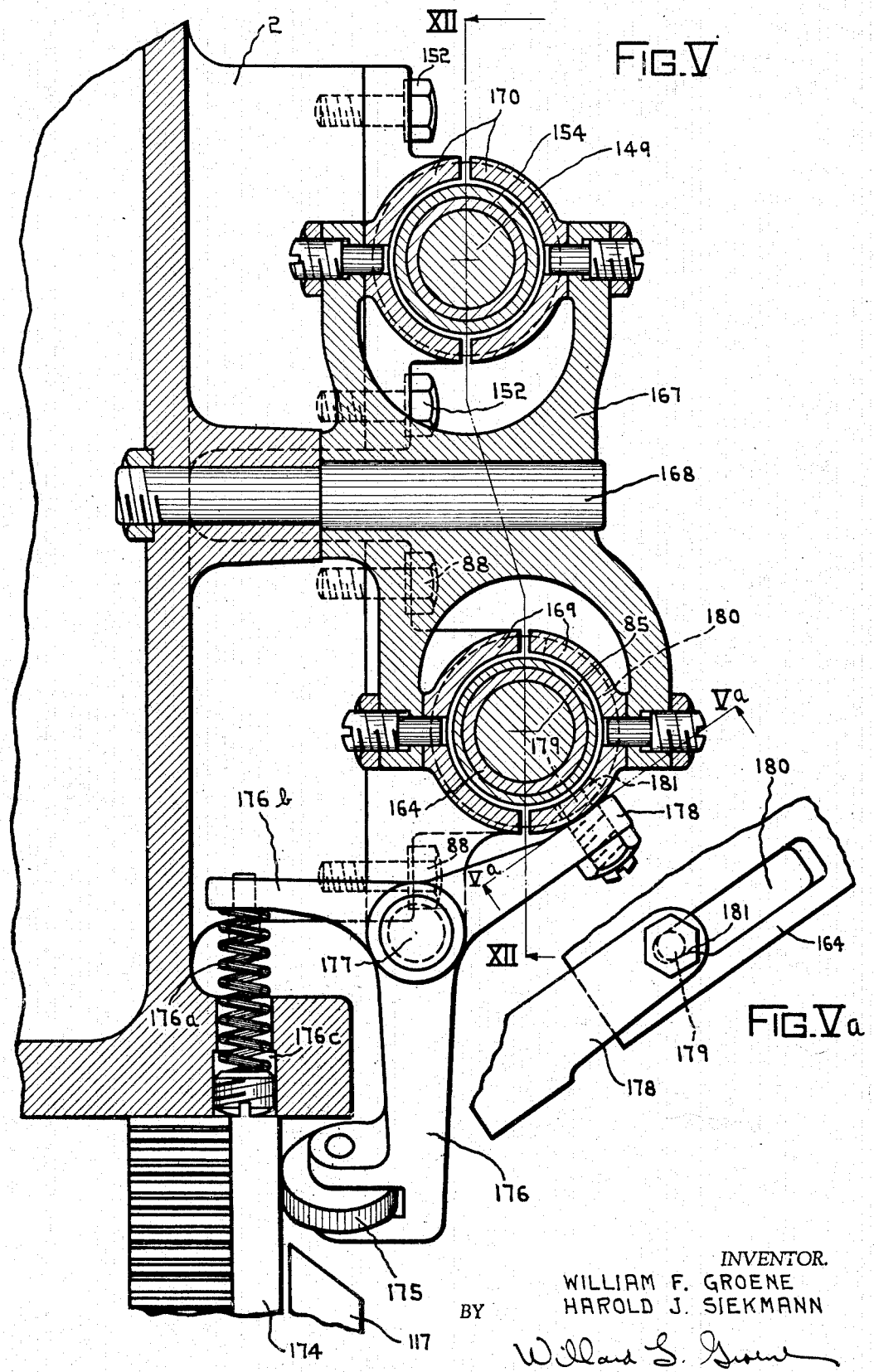

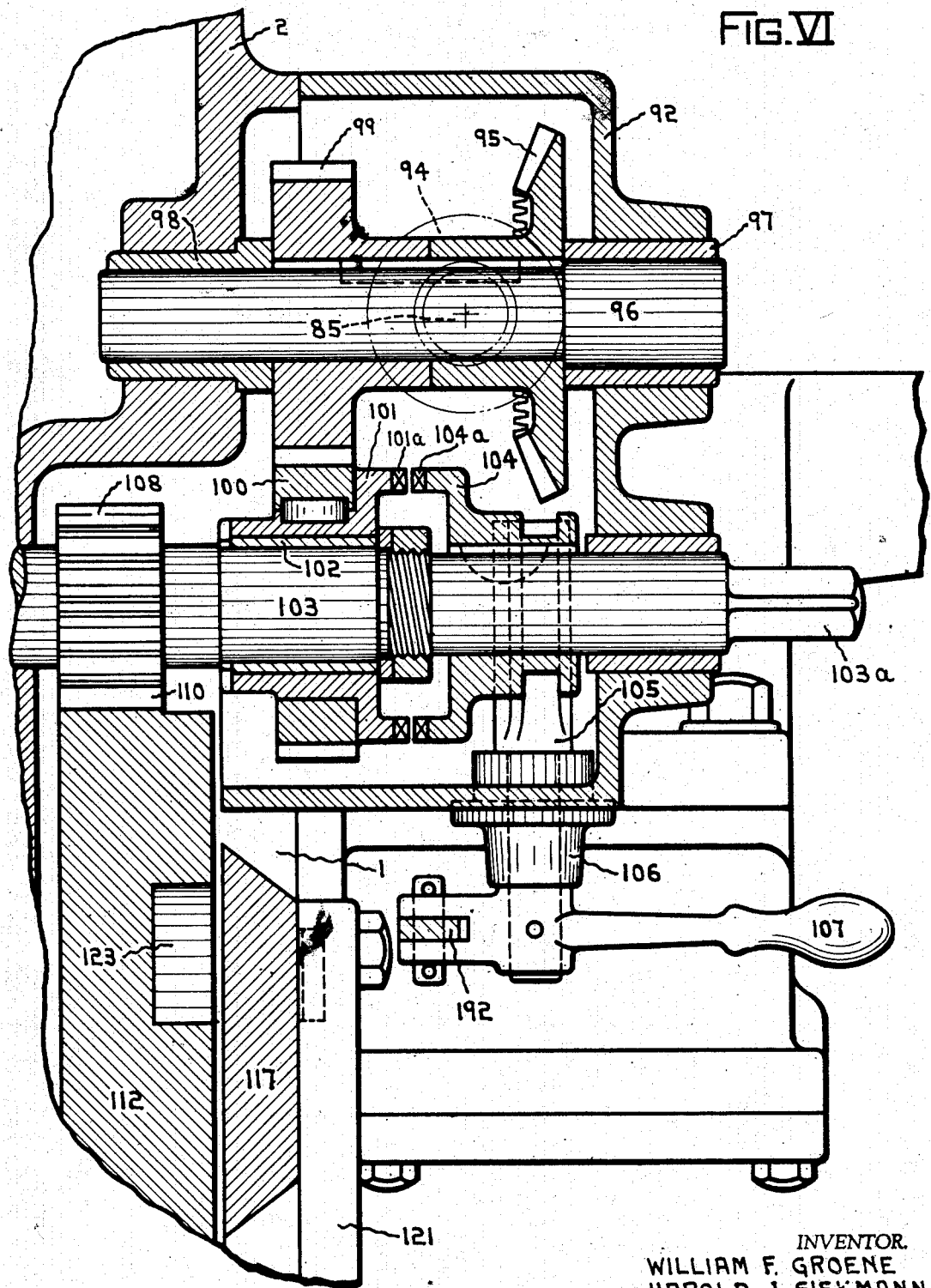

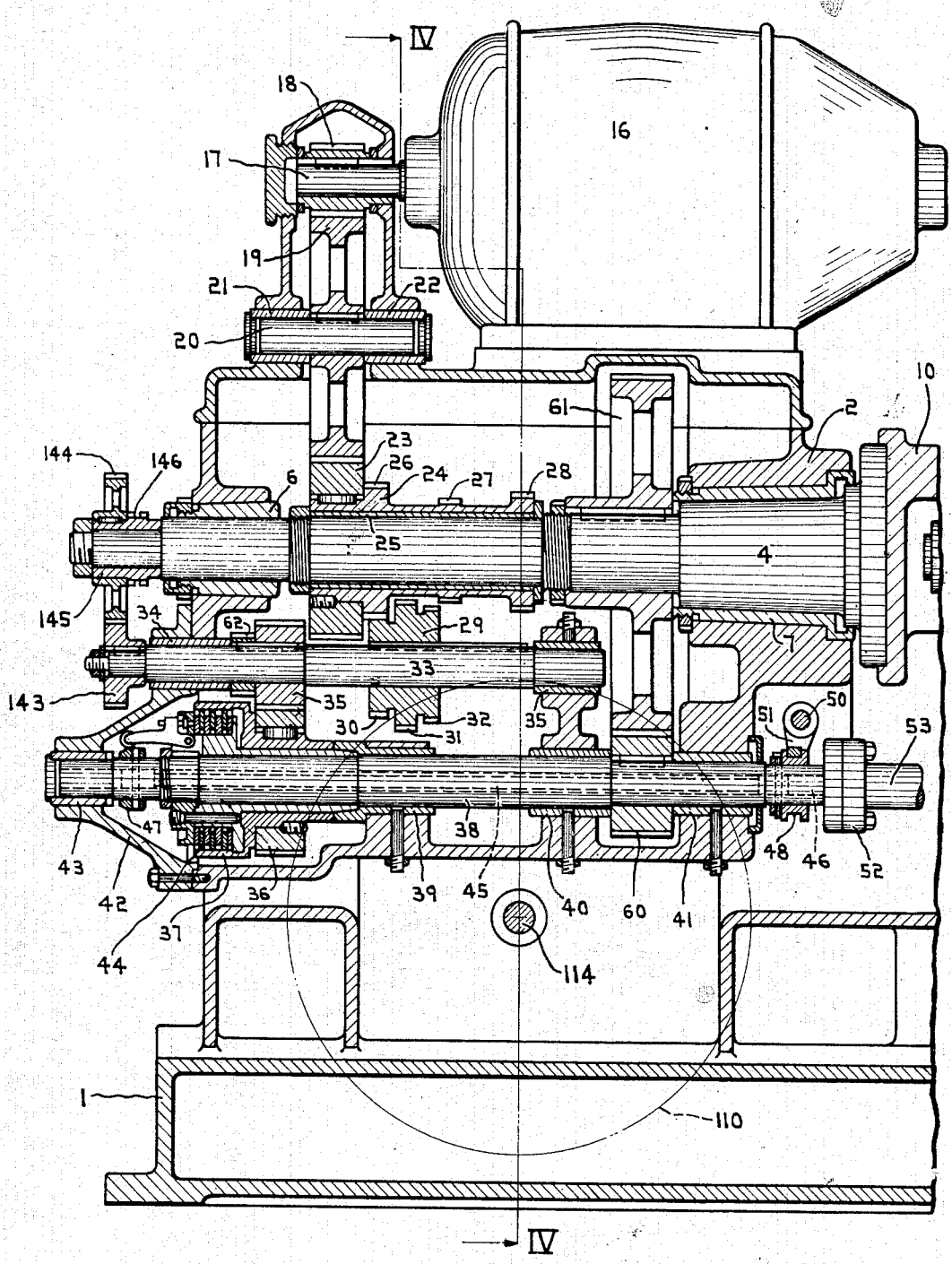
FIG. VII
INVENTOR.
WILLIAM F. GROENE
HAROLD J. SIEKMANN

Dec. 30, 1941.      W. F. GROENE ET AL      2,268,200
CRANKSHAFT LATHE
Filed Nov. 29, 1940      12 Sheets-Sheet 8
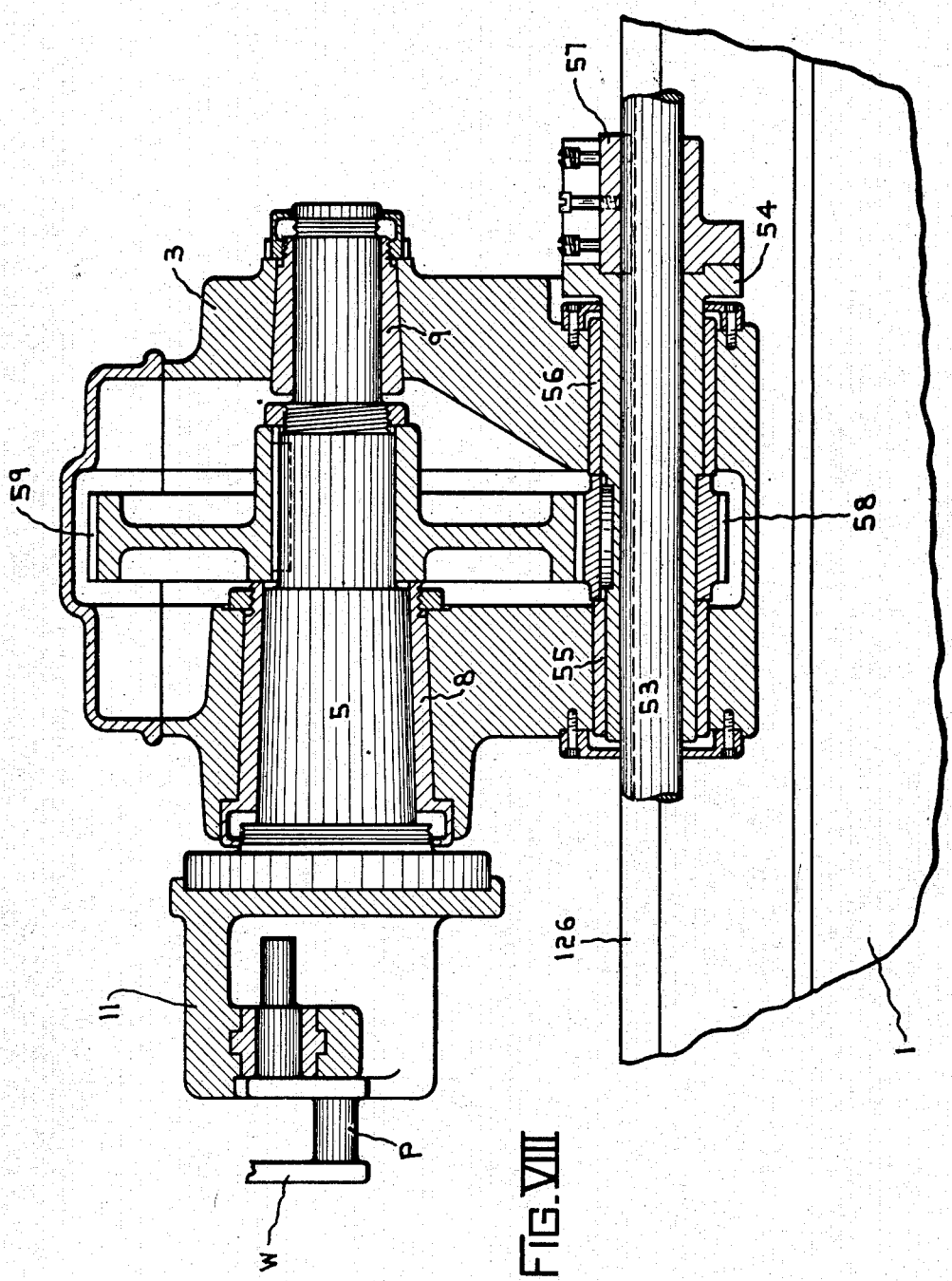
FIG. VIII
INVENTOR.
WILLIAM F. GROENE
HAROLD J. SIEKMANN
BY

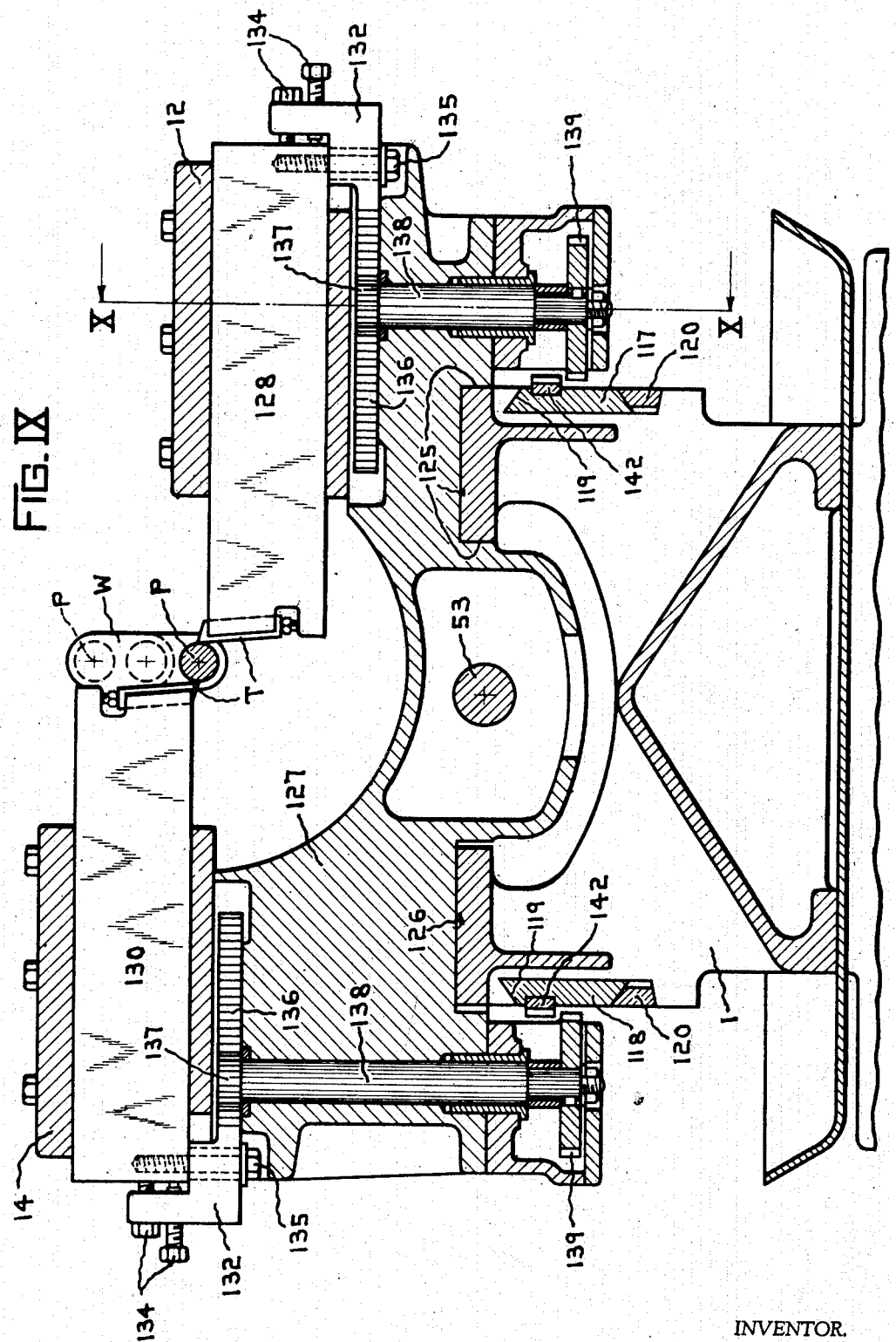

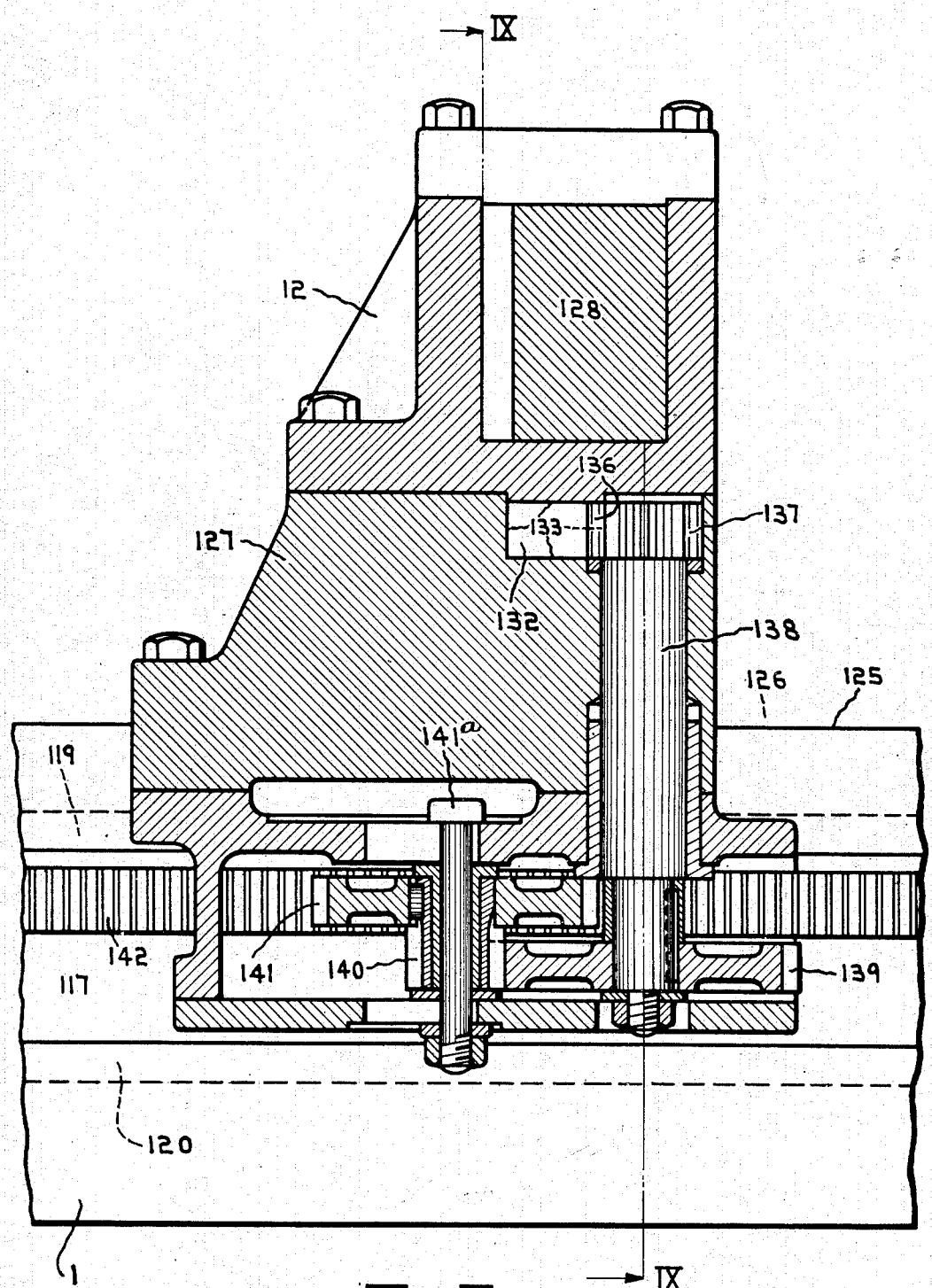

Dec. 30, 1941.  W. F. GROENE ET AL  2,268,200
CRANKSHAFT LATHE
Filed Nov. 29, 1940  12 Sheets-Sheet 11
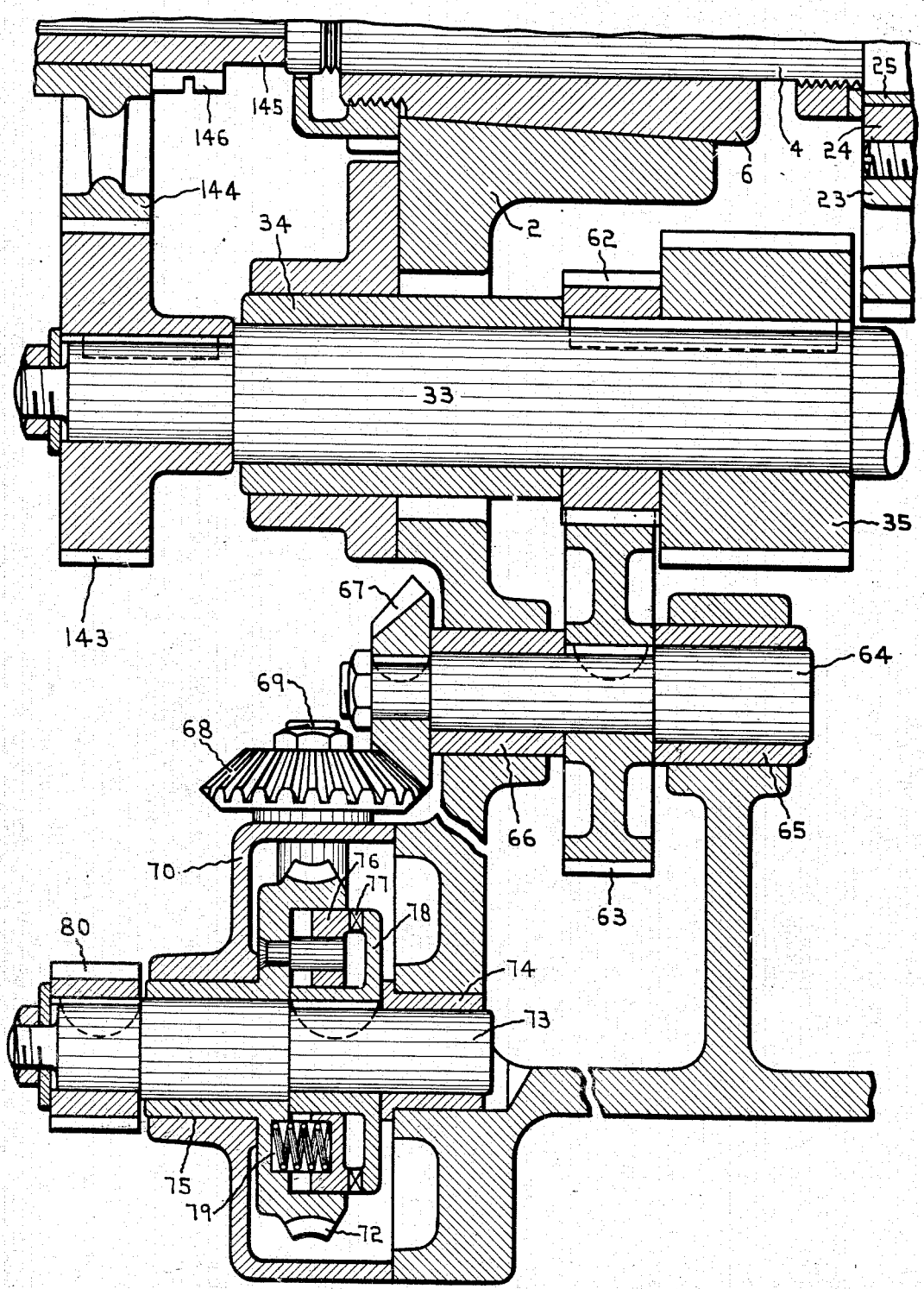
Fig. XI
INVENTOR.
WILLIAM F. GROENE
HAROLD J. SIEKMANN
BY
William L. Groene

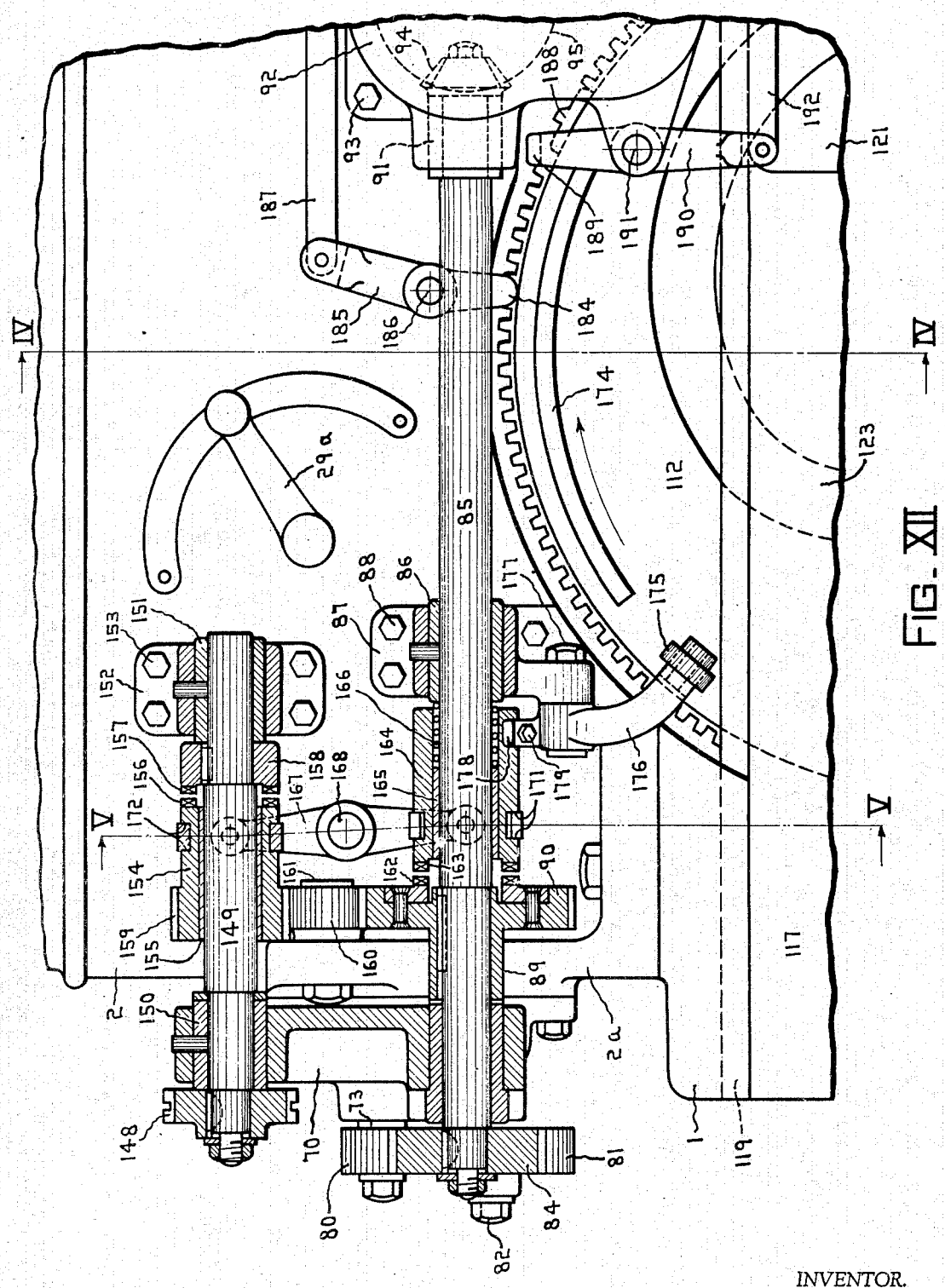

Patented Dec. 30, 1941

2,268,200

UNITED STATES PATENT OFFICE 2,268,200

CRANKSHAFT LATHE

William F. Groene and Harold J. Siekmann, Cincinnati, Ohio, assignors to The R. K. Le Blond Machine Tool Company, Cincinnati, Ohio, a corporation of Delaware Application November 29, 1940, Serial No. 367,782

8 Claims. (Cl. 82—2)

This invention pertains to improvements in lathes, particularly lathes adapted to the turning of crankshafts, and has for its main intent and purpose to set forth new and improved feeding and control mechanism for such lathes. More specifically, this invention pertains to feeding and rapid traversing mechanism and in providing versatility in arranging the feed for a multiplicity of tools for a double end drive crankshaft lathe.

Heretofore in lathes of this type, it has been found necessary to provide either a series of screw feed mechanisms for each of the individual tool slides, each of which had to be carefully readjusted by changing gears or other means to effect different speeds of movement of each of the respective tool feeding slides. While other machines were also handicapped by the utilization of individual cam feed mechanism for each of these individual cam slides necessitating the changing and re-machining and alteration of each of the cams every time it was desired to provide different rates of feed and rapid traverse for the various tool slides.

It was, therefore, with these difficulties in mind that we conceived the idea of having a common continuous rotatable cam feeding device for effecting the general to and from motion to all of the individual tool slides either in feed or rapid traverse motion by continuous rotation of this cam in one direction at a feeding rate of speed and at a rapid traversing rate of speed. It was then our object to provide in each of the individual tool feeding devices, rack and pinion mechanism actuated by the master feed and traverse cam and to provide change gearing in connection with this mechanism whereby each of the tool slides could be easily rendered effective for any rate of feed travel independent of the other individual tool slides and at a minimum of set up time and skill required on the part of the operator without altering the master feed cam.

Generally, the object is to provide in a lathe, a feed and rapid traverse actuating slide on each side of the bed of the lathe, each of which are actuated from a single master unitary rotatable feed and rapid traverse cam means which is rotated rapidly for rapid traversing these slides and slowly for moving these slides at feeding speeds while providing the necessary changes in rates of these movements by means of the configuration of the general cam means.

It is then the object to provide a series of tool slides mounted on the lathe bed, each of which has change gearing actuated by rack and pinion arrangement from the feeding and rapid traversing slide mounted longitudinally on each side of the bed of the lathe, whereby individual predetermined rates of feeding speed for each of the individual tool feeding members may be obtained by the simple expedient of selecting the proper change gears in connection with each of the individual tool feeding units without effecting the general control of the master feeding cam and slides on the bed of the lathe. Thus, by this arrangement, we provide simple means for effecting individual feeding and rapid traversing movement for each of the individual tool feeding slides of the lathe without in any way altering the general feeding mechanism of the machine.

Another object of this invention is to provide feed and rapid traverse mechanism which may be selectively connected to the general feed and rapid traverse actuating cam and slides wherein rapid traverse movement may be super-imposed upon the normal feeding operation which is continuously going on while at the same time providing a substantially positive drive for the feed mechanism in either direction whether or not the rapid traverse power is connected to the feed driving mechanism of the machine.

It is also an object of this invention to provide automatic control means associated with the rotation of the master feed cams whereby the feed and rapid traverse and spindle stop and start mechanism is automatically rendered operable in predetermined sequential relationship during the cutting cycle of the machine.

Further features and advantages of this invention will appear in the detailed description of the drawings in which:

Figure I is a front elevation of the machine showing the general arrangement of the headstock, tailstock and the tool slides and master feed cams on the bed of the lathe.

Figure II is a plan view of the machine shown in Figure I, particularly showing the headstock and tailstock and the arrangement of the various individual tool slides on the bed of the lathe.

Figure III is a left hand end elevation of the machine particularly showing the headstock and associated rapid traverse and feed gearing transmission mechanism of the lathe.

Figure IV is a vertical transverse section through the headstock end of the lathe, shown on the line IV—IV of Figures I, II, VII and XII.

Figure V is an enlarged vertical section on the line V—V of Figures I, II, and XII, particularly showing the rapid traverse engaging and disengaging mechanism.

Figure Va is a view on the line Va—Va of Figure V showing the control notch and plunger of the rapid traverse trip-out mechanism.

Figure VI is an enlarged section of the feed connecting and disconnecting mechanism and the associated control means shown on the line VI—VI of Figures I and II.

Figure VII is a longitudinal sectional view through the headstock and motor drive for actuating the lathe spindle transmission shown on the line VII—VII of Figures II, III, and IV.

Figure VIII is a vertical longitudinal section through the tailstock spindle member on the line VIII—VIII of Figure II.

Figure IX is a transverse section through the tool slide of the lathe on the line IX—IX of Figures I and II.

Figure X is an enlarged vertical section through one of the individual tool feeding members on the line X—X of Figures II and IX.

Figure XI is a diagrammatic section of a portion of the feed drive mechanism shown on the line XI—XI of Figure III.

Figure XII is a vertical section through the feed and rapid traverse mechanism on the line XII—XII of Figures III and V.

A machine incorporating our invention comprises a base 1 upon which are mounted the headstock 2 and tailstock 3 in which are respectively mounted the work spindles 4 and 5 in Figures VII and VIII, in suitable bearings 6, 7, 8, and 9. On these work spindles are carried appropriate work holders or pot chucks 10 and 11 for appropriately chucking and holding a work piece or crankshaft W. Also mounted on this base 1 are the individual tool feeding devices 12 and 13 on the front of the lathe and 14 and 15 on the rear of the lathe.

Spindle drive mechanism

The work spindles 4 and 5 are rotated in synchronism at appropriate cutting speed by means of the main drive motor 16 which is mounted on top of the headstock housing 2 and has a shaft 17 upon which is appropriately mounted the driving pinion 18, Figure VII, which in turn drives the idler gear 19 on the stud 20 suitably journaled in the bearings 21 and 22 carried by the headstock housing 2. This idler gear 19 drives the gear 23 which is fixed to the sleeve gear 24 suitably journaled by a suitable bearing 25 on the work spindle 4 and which sleeve gear 24 has various size gears 26, 27, and 28 formed integral therewith, which are adapted to be selectively engaged by the shiftable triple gear 29 comprising the gears 30, 31 and 32, which may be respectively engaged with the gears 26, 27, and 28 by sliding it on its keyed driving connection with the intermediate drive shaft 33, by appropriately moving the shifting lever 29a.

This intermediate drive shaft 33, which is suitably journaled in bearings 34 and 35 in the headstock housing 2, Figure VII, has a gear 35 fixed thereon which drives the gear 36 carried by the clutch sleeve 37, journaled on the longitudinal drive shaft 38 extending centrally and longitudinally of the bed of the lathe and carried in suitable bearings 39, 40 and 41 in the headstock housing 2 and supported at its outer end in the bracket 42 by a suitable bearing 43. A friction clutch 44 is provided for the shaft 38 whereby power may be connected to or disconnected from the gear 35 to the shaft 38 by appropriately actuating this clutch by longitudinal movement of the clutch control rod 45 suitably carried in the bore 46 in the shaft 38, which has a clutch actuating spool 47 on one end for actuating the clutch 44 in the conventional manner and a shifter yoke spool 48 on its other end, which may be actuated by the control lever 49 on a suitable rock shaft 50 carried in the headstock housing 2, which in turn has a shifting yoke 51 suitably connected to the shifting collar 48 for the shifting clutch actuating rod 45.

Co-axially mounted with the drive shaft 38 and connected thereto by a suitable coupling 52 is the drive shaft 53 which extends centrally of the bed into the driving sleeve 54 suitably journaled in bearings 55 and 56 in the tailstock housing 3, as best seen in Figure VIII. This sleeve 54 has a keyed driving connection 57, which permits sliding of the tailstock unit 3 along the bed, while at the same time always providing driving action for the driving sleeve 54. On this driving sleeve 54 is the driving pinion 58 which is arranged to drive the face gear 59 fixed on the tailstock spindle 5, whereby it may be rotated by rotation of the drive shaft 53. Similarly is provided a gear 60, Figure VII, fixed on the drive shaft 38 which is of the same size as the gear 58 just described and which in turn drives the face gear 61 fixed on the headstock spindle 4, and which gear 61 is similarly of the same size and number of teeth as the gear 59 just described. Therefore, rotation of the drive shaft 38 and the drive shaft 53 will cause synchronous rotation of the work spindles 4 and 5 and their respective work engaging members or pot chucks 10 and 11 for appropriately driving the crankshaft W from both ends without twisting or distortion of the work.

Tool feeding transmission mechanism

Power take off for the tool feeding mechanism is derived from the gear 62 fixed on the shaft 33, Figures VII and XI, which drives the gear 63 fixed on the bevel pinion shaft 64 suitably journaled in the bearings 65 and 66 in the headstock housing 2. On shaft 69, Figure III, is mounted the usual worm 71 which drives the worm wheel 72 which is journaled on the worm wheel shaft 73 mounted in the bearing 74 in the headstock housing 2 and supported at its other end in the bearing portion 75 of the worm wheel 72.

In the worm wheel 72, Figure XI, is provided a combined overload and over-running clutch device comprising the spring urged clutch member 76 which has appropriate automatically disengageable clutch teeth 77, which mate with similar teeth on the clutch member 78 fixed to the shaft 73 and which is held in normal contact therewith by means of suitable compression springs 79 which bear against the worm wheel 72 and against the member 76 forcing it outwardly against the member 78 during normal driving operation. Should however, the shaft 73 be restricted from rotation or rotated at a greater rate of speed than that of the worm wheel 72, the clutch teeth 77 will slide past one another to permit this relative motion of the shaft 73 with respect to the worm wheel 72 without damage to the lathe mechanism.

Fixed on the worm wheel shaft 73 is the output pinion 80, Figure III, which drives a suitable change gear 81 appropriately mounted on a stud 82 on the quadrant 83 which in turn drives the change gear 84, Figure XII, on the feed drive shaft 85 which is appropriately mounted in a suitable bearing 86 on the bracket 87 bolted to the headstock 2 by suitable screws 88 and also supported through the bearing portion 89 of the rapid traverse clutch gear 90 in the web portion 2a of the headstock 2. Its right hand end is also supported in an appropriate bearing 89 carried in the feed control housing 92 also mounted on the front of the headstock 2 by appropriate screws 93. The change gearing comprising the gears 80, 81, and 84 is provided to permit various selections of relative speed of rotation of the shaft 85 with respect to the headstock transmission gearing. On this feed drive shaft 85 in the housing 92 adjacent to bearing 91 is fixed a bevel pinion 94, Figures VI and XII, which drives the bevel gear 95 fixed on the shaft 96 which is journaled in suitable bearings 97 and 98 in the housing 92 and headstock 2 respectively. Also fixed on this shaft 96 is the driving gear 99 which drives the feed clutch gear 100 which is fixed on the clutch member 101 journaled on a suitable bearing 102 on the feed cam drive shaft 103. On this shaft 103 is slidably mounted in driving relationship the shifting clutch member 104 which may be actuated to engage its teeth 104a with the teeth 101a of the member 101 by appropriately rocking the shifting member 105 mounted in a suitable bearing 106 in the housing 92 by actuating the control lever 107 so as to connect or disconnect driving power from the gear 100 to the shaft 103. A suitable squared end 103a is provided on this shaft for the application of a crank handle for manual rotation of the shaft 103 when the clutch members 101 and 104 are disconnected.

This shaft 103 is journaled appropriately in the headstock 2 of the lathe, Figure IV, and has pinions 108 and 109 at the front and rear portions of the headstock, as best seen in this figure, which respectively engaged the ring gears 110 and 111 of the feed disc cams 112 and 113 respectively which are carried on the shaft 114 suitably journaled in bearings 115 and 116 in the bed 1 of the lathe. Thus, rotation of the shaft 103 effects simultaneous rotation of the feeding disc cams 112 and 113 mounted at the front and rear of the lathe bed.

Along the front and rear sides of the bed 1, are slidably mounted the rack slides 117 and 118 respectively which are appropriately guided in suitable dove tail guideways 119 formed in the bed 1 and appropriately snugly slidably held in said guideways by suitable gibs 120, as best seen in Figure III. On each of these rack slides is fixed a cam roller supporting plate 121 carrying the cam roller 122 which operates in the scroll cam slots 123 and 124 formed in the disk cams 112 and 113, so that rotation of the disk cams 112 and 113 effects sliding reciprocable motion in the rack slide 117 and 118, the configuration of the scroll cam slots 123 and 124 being of such character to give the desired rate of variable feed or rapid traverse movement to the tool feeding devices.

Tool feeding devices

Mounted on the ways 125 and 126 of the bed 1 are the tool carriages 127 and 127a on top of which are mounted, each side of the work piece W, the tool feeding devices 12 and 13 on the front of the lathe and 14 and 15 on the rear of the lathe, as pointed out above. In each of the tool feeding devices is provided the slidingly mounted tool bars 128, 129, 130, and 131 which carry the cutting tools T, which operate upon the crank pins P of the work piece W. These tool bars 128, 129, 130, and 131, as best seen in Figures IX and X, are adjustably connected to rack bar members 132 which are appropriately slidably mounted in suitable guide ways 133 in the carriage 127 or 127a by means of suitable adjusting screws 134 and the locking screws 135, whereby the rack member 132 may be relatively adjusted with respect to the tool bars and may be locked in adjusted position by the screw 135 so as to effect the accurate setting of the cutting tools T to proper depth of cut. On these rack members 132 are provided the racks 136 which are engaged by the rack pinion 137 on the vertical rack pinion shaft 138 suitably journaled in the carriage member 127 and 127a. On the lower end of this shaft 138 is provided a change gear 139, which in turn is connected to the change gear 140, Figure X, on the change gear stud 141a which contains the compound gear 140—141, the gear 141 in turn engaging a longitudinal rack 142 fixed on the rack slide 117 and 118, so that when these rack slides 117 and 118 are actuated by the mechanism as described, the tool bars 128, 129, 130, and 131, may be respectively actuated through the change gear mechanism, as shown particularly in Figure X. By providing this individual change gearing as shown in Figure X for each of the tool feeding devices, individual control of the relative rate and amount of travel of each individual tool bar, is easily effected by properly selecting the gears on the shafts 138 and 140.

Normally, these tool carriages 127 and 127a are bolted securely to the lathe bed and do not move along on the respective bed ways 125 and 126 but are so arranged to provide easy means for properly longitudinally positioning the respective carriages to effect the proper positioning of the cutting tool bars with respect to the work to be machined. Thus in this arrangement, we have provided a most efficient means for effecting the individual control of the actuation of each individual tool feeding device and to also provide extremely simple means for properly positioning the cutting tools relative to the work to be machined.

Rapid traverse mechanism

In addition to the feeding motion imparted to the various tool feeding devices 12, 13, 14, and 15, through the medium of the feed disk cams 112 and 113 and their respective rack slides 117 and 118, as described, rapid traversing mechanism is provided in conjunction with this apparatus to effect the rapid movement of the cutting tools T on their respective tool bars to and from the work at appropriate times to reduce to a minimum the time required for getting the tools up to initial cutting position and for rapidly retracting them from the work at the conclusion of the cutting cycle. The power take off for this rapid traverse mechanism is initially derived, as shown in Figures III and VII, from the gear 143 fixed on the outer end of the drive shaft 33, which is driven rapidly from the main drive motor 16 as described, and which gear 143 drives the gear 144 fixed in driving relation on the sprocket sleeve 145 journaled on the outer end of the work spindle 4. On this sleeve 145 is provided the sprocket 146 over which operates the chain 147 as best seen in Figure III, which in turn operates over the sprocket 148 fixed on the rapid traverse clutch shaft 149 journaled in the bearing 150 in the bracket 70 and in the bearing 151 in the bracket 152 also fixed to the headstock 2 by the screws 153, as best seen in Figure XII. Upon this shaft 149 intermediate these bearings 150 and 151, is journaled a clutch spool 154 on a suitable bearing 155 and has provided on it clutch teeth 156 which are arranged to engage the mating clutch teeth 157 on the clutch member 158 which is fixed to the shaft 149. Associated with this clutch member 156 is provided the gear 159 formed integrally with the clutch sleeve 154 and which drives, through an idler gear 160 journaled on an appropriate stud 161, a gear 90 fixed on the shaft 85. Formed on this gear 90 are the clutch teeth 162, which are arranged to be engaged by the clutch teeth 163 of the clutch sleeve 164 which is journaled on the shaft 85 by means of a suitable bearing 165. This clutch sleeve 164 is normally urged toward the gear 90, so that their respective clutch teeth 162 and 163 will normally enter into engagement under the influence of the compression spring 166 provided around the shaft 85 and arranged to move the clutch sleeve 164 to the left, as shown in Figure XII.

The clutch sleeves 154 and 164 are connected together for simultaneous operation by means of the compound yoke 167, as best seen in Figure V, which is pivotally mounted on a stud 168 fixed in the headstock 2. Upon the outer end of the compound yoke member 167 are the shoes 169 and 170, which operate in appropriate slots 171 and 172 in the respective sleeves 164 and 154 so as to effect axial sliding of these clutch sleeves on their respective shafts 85 and 149, and since these sleeves are connected together, the operation of the sleeve 164 will also be automatically effected by means of the spring 166 actuating the clutch sleeve 164 through the interconnection of the compound yoke member 167, so that normally the spring 166 causes the engagement of the clutch teeth 162 and 163 and also the clutch teeth 156 and 157, the gear 159 sliding in the teeth of the idler gear 160 to permit this engagement of the clutch sleeve 154 with the respective clutch member 158 fixed on the shaft 149.

*Operation and control*

The operation of this machine is substantially as follows:

Assuming that the work piece or crankshaft W has been properly placed in the chucking devices 10 and 11 and that the cutting tools are in retracted position away from the work for the beginning of the cutting cycle, the control lever 49 is first moved to the right Figure I, so as to render the clutch 44 operative whereby the continuously rotating spindle drive motor 16 is connected to the work spindles 4 and 5 causing them to be rotated at the appropriate cutting speed, as selected by moving the triple gear 29 by means of its control lever 29a to the desired position. As soon as the control lever 49 has been thus operated to effect the drive through the clutch 44, feed driving power and rapid traverse driving power are then respectively being continuously delivered to the shaft 85 for the feed and to the shaft 149 for the rapid traverse, Figure XII, as described. At this time the feed and rapid traverse connecting clutch 104, Figure VI, is disengaged and in order to start the rapid traversing and feeding of the cutting tools on their respective tool bars after the spindle has been started as above described by operating the lever 49, the lever 107 is then manipulated so as to effect the engagement of the clutch member 104 with the clutch member 101, thus connecting the rapid traverse and feed driving power to the shaft 85 to rotate the disk cam 112 and 115 for actuating the rack slide 117 and 118 and thus the various tool bars for feeding the tools to and from the work.

At this time, however, the rapid traverse clutching members 154 and 164 are rendered operative for interconnecting their respective clutch teeth 156—157 and 162—163 by the spring 166, so that rapid actuation of the shaft 85 takes place; much more rapidly than that of the normal feeding power delivered to the gear 84 of this shaft 85 causing the combined overload and over-running clutch 76 of Figure XI, to over-ride so that its shaft 73 and gear 80 are rotated relatively more rapidly than the worm wheel 72, which normally drives the tools at feeding speed. This continues as the tools are thus rapidly advanced to actual contact with the work at the beginning of the cutting action on the work piece.

When this point has been reached, the arcuate cam surface 174, carried on the disk cam 112, Figures V and XII, actuates the contact roller 175 on the lever 176, which is pivotally mounted on a suitable stud 177 fixed on the bracket 87 and which has a projecting arm 178 having a projecting set screw 179 which is arranged to engage a slot 180, Figure Va, formed in the periphery of the clutch sleeve 164, so that when the roller 175 rides up on this arcuate cam surface 174, depressing the compression spring 176a which engages the arm 176b of the lever 176 and carried in the bore 176c in the headstock 2, the set screw 179 will be urged against the periphery of the clutch sleeve 164, so that it will enter the slot 180 thereof, as it is rotated and will enter this slot and move relatively along the slot engaging inclined surface 181, Figure Va, of this slot, whereupon the set screw 179 bearing against this surface 181 upon continued rotation of the clutch sleeve 164 will cause it to be pulled to the right, Figure XII, against the spring 166, thereby automatically disengaging its clutch teeth 163 with the clutch teeth 162 and also disengaging the clutch sleeve 164 from the member 158 on the shaft 149, resulting in the automatic rapid disengagement of the rapid traverse at the exact instant of beginning of the actual cutting cycle. The cam 174 is designed to continue holding the roller 175 against the yielding pressure of the spring 176 and the set screw 179 in the position shown in Figure Va during the normal in-feeding operation of the cutting tools as effected by power through the shaft 85 from the feed driving transmission as described.

The feeding of the tools continues as the disk cams rotate clockwise as shown in Figure I until the cam roller 122 moves relatively to the position 122a at which time the course feed for cheeking down the faces 182 of the webs of the crankshaft W is completed, whereupon the cam then has a relatively slow powerful feeding action near its center of rotation as the cam roller 122 moves relatively from the position 122a to the position 122b. A dwell period is then accomplished by non-movement of the roller 122 relative to the axis of rotation of the disk cam, as these rollers move relatively from the position 122b to the position 122c. After the cams have been moved around to the position 122c, having the tools brought down to position and completion of their dwell, the roller 75 on the lever 176, Figure V, is again permitted to ride off of the cam 174, under the influence of the spring 176a thereby withdrawing the pin 179 from the slot 180 in the clutch sleeve 164, which automatically permits engagement of this sleeve 164 with the clutch 162 under the influence of the spring 166 and similarly to engage the clutch member 154 with the member 158 again connecting the rapid traverse drive to the shaft 85 causing the clutch 76 Figure XI to again override and cause the rapid rotation of the disk cams 112 and 113, during which time the roller 122 is moved from the relative position 122c back to the position 122 shown in Figure I, causing a rapid traverse withdrawal of the tools away from the work back to their initial starting position.

During this rapid rotation of the disk cams, a dog 183, Figure I, carried by the disk cam 112 engages the end 184 of a lever 185, Figure XII, pivotally mounted on a suitable stud 186 fixed in the headstock 2, which is connected through suitable linkage 187 to the lever 49, so that this lever 49 will be automatically moved to position so as to disengage the driving clutch 44 stopping the work spindle and the feeding mechanism of the lathe. Also at the same time, a dog 188 also carried on the disk cam 112, serves to engage the end 189 of a lever 190, pivotally mounted on a suitable pin 191 fixed in the bracket 92 and connected by linkage 192 to the control lever 107 serves to automatically disengage the feed mechanism so that in the event it would be desirable to jog the work spindle by manually operating the lever 49 this could be done without causing the rapid traversing movement of the cutting tools at this time.

It will thus be seen that we have provided herein, a device which is fully automatic in all of its operating functions and which is fool proof in so far as the operating cycle of the machine is concerned and requires a minimum of effort and thought upon the part of the operator in effecting the operation of the machine. It is also to be noted that certain advantageous constructions of cam mechanism is herein provided, wherein in a continuous unitary operation of the cam in a single direction effects all of the rapid traverse infeed, dwell and return rapid traverse motion for the cutting tools. It also will be noted that the rapid traverse mechanism is rendered operative at the appropriate time by fully automatic mechanism.

A still further feature to be noted is that of the over-running and over load clutching device which permits the rapid traversing of the tools at any time during the cutting cycle as predetermined and desired and also at the same time prevents damage to the feed mechanism in the event the tools would strike an obstruction greater than the power to be delivered to it whereupon, the over-running clutch then functions as an overload clutch to prevent damage to the lathe feeding mechanism when the tools were strained beyond their normal feeding power operation.

It is also to be noted that the lathe is economical in construction and simple in so far as the required number of parts are concerned and also with respect to the flexibility with which each of the individual tool feeding units may be arranged and positioned relative to the work and be operated in distinct predetermined feeds for each of the individual tool holders so necessary to the proper and efficient machining of certain types of work, particularly of the nature of the crankshaft.

Having thus fully set forth and described our invention, what we claim as new and desire to secure by United States Letters Patent is:

1. In a lathe spindle driving transmission, a work spindle, an electric driving motor, a multiple gear journaled on said spindle, means for connecting said motor to said gear, a drive shaft in said transmission, gearing interconnecting said drive shaft with said multiple gear journaled on said work spindle, whereby various different rates of speed may be effected between said multiple gear and said drive shaft, a second drive shaft in said transmission, a clutch on said second mentioned drive shaft, means for driving said clutch from said first mentioned drive shaft, means for actuating said clutch for connecting or disconnecting power from said first mentioned shaft with respect to said second mentioned shaft and means for driving said work spindles from said second mentioned shaft.

2. In a lathe work spindle driving transmission, a work spindle, a driving motor, a multiple gear journaled on said spindle, means for driving said multiple gear from said driving motor, a drive shaft in said transmission, change gearing interconnecting said multiple gear and said drive shaft whereby said drive shaft may be rotated at a plurality of different speeds relative to said multiple gear, a feed take-off from said drive shaft for effecting feed and rapid traversing of the tool feeding mechanism associated with said work spindle of said lathe, a second drive shaft in said transmission, a clutch on said second mentioned drive shaft, means for driving said clutch from said first mentioned shaft, means for actuating said clutch to effect connecting or disconnecting of power from said first mentioned shaft relative to said second mentioned drive shaft, and means for connecting said second mentioned drive shaft to said work spindle.

3. In a feed and rapid traverse mechanism for lathe, driving transmission mechanism connected to the tool feeding devices of said lathe for actuating them at feeding speeds, rapid traverse driving mechanism adapted to be connected to or disconnected from said feeding devices for actuating them at rapid traversing movement, a source of power for actuating both of said feed and rapid traverse driving mechanisms, and a combined overload and over-running clutch device between said feed driving mechanism and said source of power.

4. In a feed and rapid traverse mechanism for lathe, a lathe headstock, a transmission in said headstock, a feed drive shaft actuated from said headstock transmission, means for connecting said feed output shaft to the feed mechanism of said lathe, a rapid traverse shaft actuated from said headstock transmission, an over-running and overload clutch device between said headstock transmission and said feed drive shaft, and means for connecting or disconnecting said rapid traverse shaft to said feed drive shaft.

5. In a lathe, a headstock, a spindle transmission in said headstock, feed driving mechanism connected to the tool feeding devices of said lathe and driven from said headstock transmission, a rapid traverse driving transmission connectable or disconnectable to said feed driving mechanism positively connectable or disconnectable with respect to said feed drive mechanism, and an overload and over-running clutch device interconnected between said headstock transmission and said feed drive mechanism, whereby connection of said rapid traverse mechanism to said feed drive mechanism permits rapid rotation of said feed drive mechanism by said rapid traverse mechanism while said feed drive mechanism continues to be actuated from said headstock transmission.

6. In a lathe, a headstock, a work spindle journaled in said headstock, a work spindle driving motor associated with said headstock, a drive shaft in said headstock, means for driving said shaft at a plurality of different speeds relative to said motor, means for connecting or disconnecting said drive shaft to said work spindles, feeding power take off means from said shaft connected to the tool feeding devices of said lathe for actuating them at feeding speeds, rapid traversing power take off mechanism from said shaft arranged to be connected or disconnected to said feeding mechanism for actuating said tool feeding devices at rapid traverse speeds, and a combined overload and over-running clutch interconnected between feeding power take off mechanism and said tool feeding devices.

7. In a lathe, feed and rapid traverse mechanism, a headstock, a spindle driving transmission in said headstock, a feed drive shaft driven at feeding speeds from said headstock transmission, a rapid traverse shaft driven at rapid traverse rate of speed from said headstock, a combined overload and over-running clutch device between said headstock transmission and said feed drive shaft, a clutch sleeve journaled on said rapid traverse drive shaft, means for positively driving said clutch sleeve from said feed drive shaft, a clutch sleeve member journaled on said feed drive shaft, means for simultaneously engaging said clutch sleeve on said rapid traverse shaft with a clutch fixed on said rapid traverse shaft and to engage said clutch sleeve on said feed drive shaft in driving engagement with said feed drive shaft, whereby said feed drive shaft may be driven at rapid traverse speeds from said rapid traverse drive shaft, while said combined overload and over-running clutch permits acceleration of said feed drive shaft, while feeding power continues to be applied to said overload and over-running clutch from said headstock transmission.

8. In a lathe, a feed and rapid traverse mechanism, a headstock, a spindle driving transmission in said headstock, a feed drive shaft driven at feeding speeds from said headstock transmission, a rapid traverse shaft driven at rapid traverse rate of speed from said headstock, a combined overload and over-running clutch device between said headstock transmission and said feed drive shaft, a clutch sleeve journaled on said rapid traverse drive shaft, means for positively driving said clutch sleeve from said feed drive shaft, a clutch sleeve member journaled on said feed drive shaft, means for simultaneously engaging said clutch sleeve on said rapid traverse shaft with a clutch fixed on said rapid traverse shaft and to engage said clutch sleeve on said feed drive shaft in driving engagement with said feed drive shaft, whereby said feed drive shaft may be driven at rapid traverse speeds from said rapid traverse drive shaft, while said combined overload and over-running clutch permits acceleration of said feed drive shaft, while feeding power continues to be applied to said overload and over-running clutch from said headstock transmission, and automatic means operable by the movement of the tool feeding devices of said lathe for disengaging said clutch sleeve on said feed drive shaft while simultaneously disengaging said clutch sleeve from driving engagement with the clutch on said rapid traverse driving shaft.

WILLIAM F. GROENE.
HAROLD J. SIEKMANN.